(12) United States Patent
Denton

(10) Patent No.: US 7,463,656 B2
(45) Date of Patent: *Dec. 9, 2008

(54) MULTI-STAGE SONET OVERHEAD PROCESSING

(76) Inventor: I. Claude Denton, 6965 SW. 162nd Pl., Beaverton, OR (US) 97007

( * ) Notice: Subject to any disclaimer, the term of this patent is extended or adjusted under 35 U.S.C. 154(b) by 1051 days.

This patent is subject to a terminal disclaimer.

(21) Appl. No.: 10/428,167

(22) Filed: Apr. 30, 2003

(65) Prior Publication Data

US 2003/0198232 A1  Oct. 23, 2003

Related U.S. Application Data

(63) Continuation of application No. 09/860,367, filed on May 18, 2001, now Pat. No. 6,580,731.

(51) Int. Cl.
*H04J 3/02* (2006.01)
(52) U.S. Cl. ........................... 370/539; 370/541
(58) Field of Classification Search ............... 370/535, 370/539, 541, 389
See application file for complete search history.

(56) References Cited

U.S. PATENT DOCUMENTS

| | | | | |
|---|---|---|---|---|
| 5,040,170 A | * | 8/1991 | Upp et al. .................. 398/50 |
| 5,572,515 A | * | 11/1996 | Williamson et al. ......... 370/252 |
| 5,621,383 A | * | 4/1997 | Yoshiyama ................. 340/506 |
| 5,742,765 A | * | 4/1998 | Wong et al. ................ 709/230 |
| 5,838,924 A | * | 11/1998 | Anderson et al. ........... 709/239 |
| 5,841,760 A | * | 11/1998 | Martin et al. ............... 370/242 |
| 5,907,682 A | * | 5/1999 | Miyazawa ................. 709/230 |
| 6,034,947 A | * | 3/2000 | Yoshida et al. ............. 370/244 |
| 6,041,066 A | * | 3/2000 | Meki et al. ................. 370/512 |
| 6,188,692 B1 | * | 2/2001 | Huscroft et al. ........ 370/395.51 |
| 6,556,593 B1 | * | 4/2003 | Herkersdorf et al. ........ 370/532 |
| 6,839,871 B2 | * | 1/2005 | Patel et al. ................. 714/707 |
| 2002/0009100 A1 | * | 1/2002 | Raghavan et al. ........... 370/474 |
| 2004/0131090 A1 | * | 7/2004 | Clauberg .................... 370/540 |
| 2006/0212780 A1 | * | 9/2006 | Ohira et al. ................ 714/776 |

* cited by examiner

*Primary Examiner*—Ajit Patel

(57) ABSTRACT

An overhead processor processes overhead bytes in a stream of Synchronous Optical Network (SONET) frames in multiple levels. In one embodiment, the overhead processor includes three stages. A first stage provides access for external processing of a first set of overhead bytes in the stream of SONET frames. A second stage is programmable to process a second set of overhead bytes in the stream of SONET frames. A third stage processes a third set of overhead bytes in each frame in the stream of SONET frames.

28 Claims, 9 Drawing Sheets

MULTI-STAGE SONET OVERHEAD PROCESSING

The is a continuation of U.S. patent application Ser. No. 09/860,367, filed on May 18, 2001 now U.S. Pat. No. 6,580,731.

FIELD OF THE INVENTION

The present invention pertains to the field of telecommunications. More particularly, this invention relates to processing Synchronous Optical Network (SONET) overhead.

BACKGROUND

Fiber optics have provided a substantial increase in the volume of data that networks can carry. Synchronous Optical Network (SONET) is a standard that defines telecommunication transmissions over fiber optics. SONET defines a number of different data rates for different levels of service. A SONET network can carry from about 52 Megabits per second to about 10 Gigabits per second over a single optical fiber. In comparison, a typical analog modem operating at maximum efficiency can achieve a mere 56 Kilobits per second. At the 10 Gigabit SONET rate, a single optical fiber can carry enough data to handle well over 100,000 simultaneous voice calls. SONET networks are likely to carry even larger volumes of data in the future.

SONET is often used as a "trunk" or "backbone" network due to the large volume of data that SONET can handle. That is, many network customers do not yet need 10 Gigabits of bandwidth per second and do not want to pay for unneeded bandwidth. In which case, such customers are generally provided with lower data rate services like analog phone lines, Digital Subscriber Lines (DSLs), digital cable lines, Integrated Service Digital Network (ISDN) lines, T1 lines, etc. These lower rate services typically connect customers in a given region to a local "central office" or Internet "Point of Presence" (POP). Central offices and POPs, in turn, are connected by trunk, or backbone, lines, like SONET lines. The term "central office" should be understood to imply either a traditional telecommunication central office or an Internet POP throughout this document.

Many smaller data streams from the lower rate services are combined in a SONET line to travel among central offices. A data stream that goes into a SONET line at one central office will be packaged into SONET frames for transmission. At the destination office, the data stream will be recovered, or rebuilt, from the data in the SONET frames. Data switching and aggregation at each of these points, as well as within the network among central offices may be accomplished through SONET frame multiplexing and switching equipment, or through data packet switching equipment such as routers. Routers may have multiple ports to handle a variety of network services, including one or more SONET ports. User data may pass through numerous routers from origin to destination.

In addition to the user data, or payload, a SONET line carries a considerable amount of control data, or overhead. Control data is used to configure network equipment, communicate quality of service parameters, perform error checking, and the like. SONET reserves a certain amount of bandwidth for overhead functions. Only a portion of that bandwidth is utilized for standardized functions. SONET equipment generally includes fixed-function hardware to process the standard overhead functions. The fixed-function hardware provides excellent speed and efficiency, but is inflexible. That is, any changes in or additions to the overhead functions require new hardware. Designing new hardware and replacing the old hardware can add considerable cost to a network.

With the emergence of all-optical networks and increasing demand for novel protection switching and provisioning features, many network equipment vendors have recognized a need to use reserved SONET overhead bandwidth for proprietary control communications. Such applications are outside the scope of SONET standardized functions, and so are poorly served by prior-art fixed-function hardware. A need exists for a more flexible SONET overhead processor architecture.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention provides the flexibility to support non-standard overhead functions, as well as changes in standard overhead functions, in a Synchronous Optical Network (SONET) without displacing bandwidth that would otherwise be available to carry payload data. The present invention processes standard and non-standard overhead functions using bandwidth reserved for standard overhead. These reserved overhead bytes are processed in multiple levels or stages to provide tremendous flexibility and cost efficiency. In various embodiments, the stages of overhead processing range from fixed-function hardware processing to infinitely-flexible software processing.

In addition to providing flexibility in standard overhead functions, the multistage processing of the present invention can use available overhead to process virtually any data functions including voice channels, encryption, additional error checking, network debugging functions, and the like. Furthermore, by using available overhead bytes rather than payload bytes for overhead functions, the present invention leaves all payload bandwidth available to carry revenue-generating user data.

Figure 1:
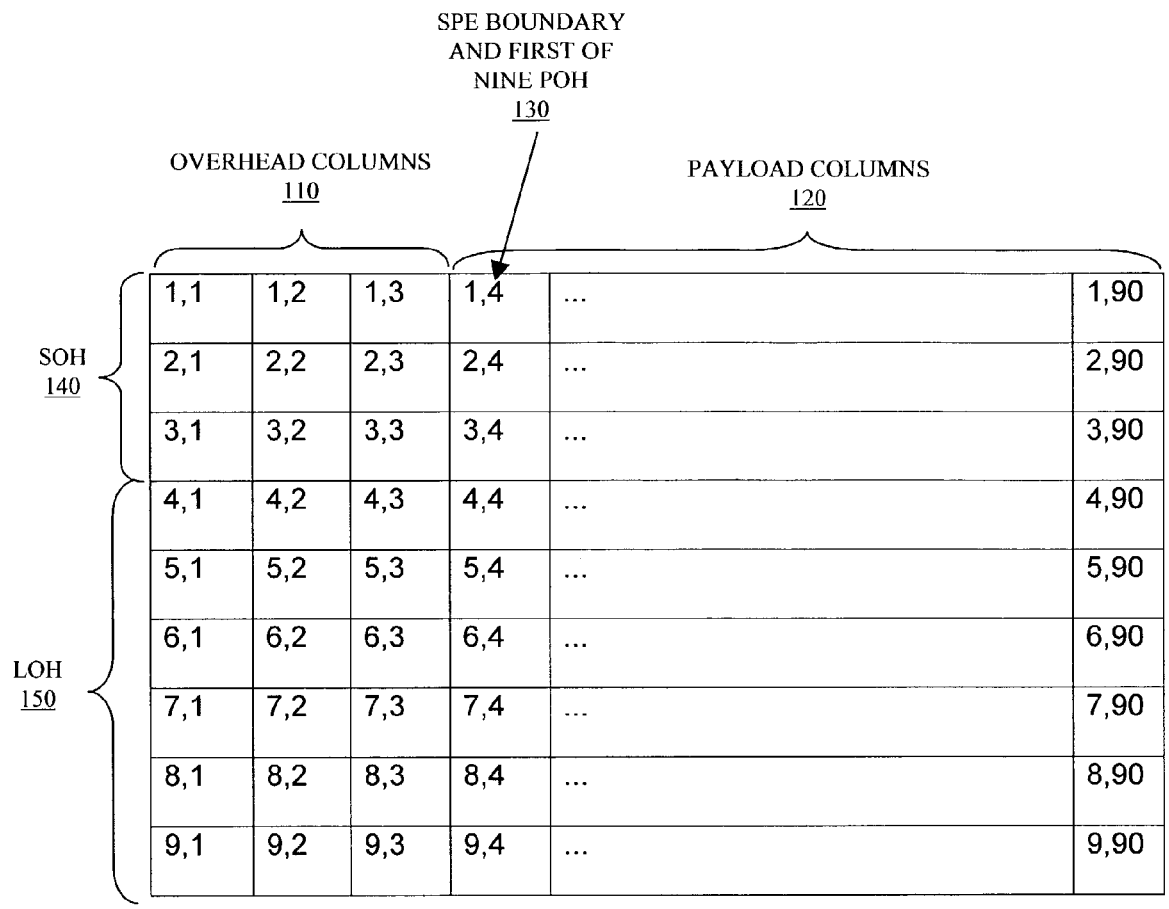
FIG. 1 illustrates one embodiment of a single-plane SONET frame.
Figure 2:
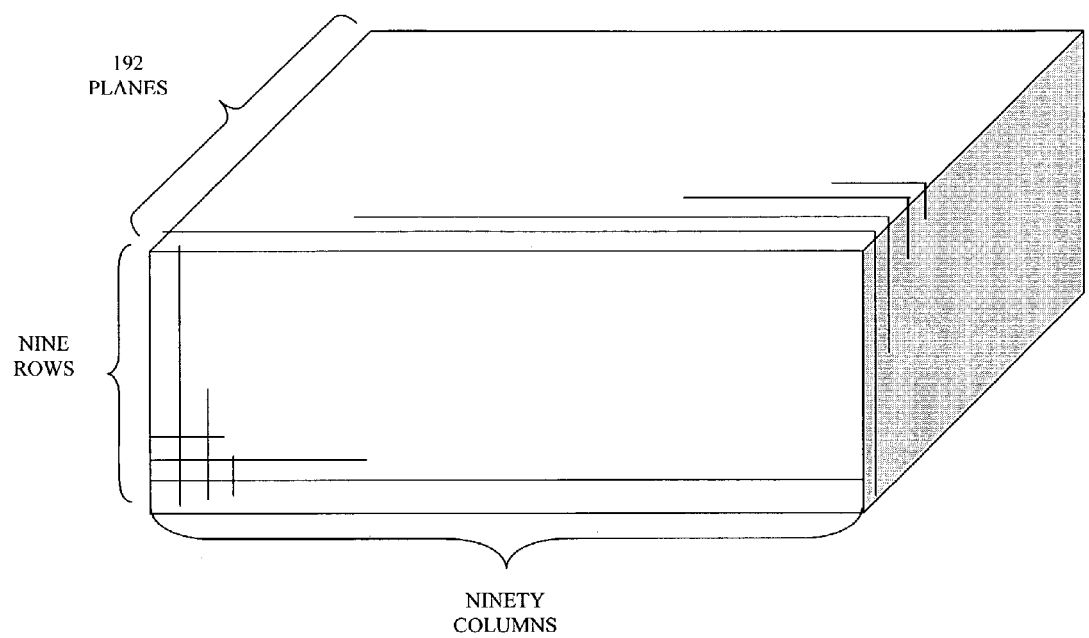
FIG. 2 illustrates one embodiment of a composite SONET frame having 192 planes.

FIGS. 1 and 2: SONET Data Formats

FIG. 1 illustrates one embodiment of a single-plane SONET frame. The SONET frame is 9 rows high by 90 rows wide. Each entry in the frame is an 8 bit byte. Transmitting the data in a frame begins at row 1, column 1 and ends at row 9, column 90. Bits of data are transmitted serially, one at a time, as pulses of light in an optical fiber. The frame is read across rows from left to right, one row at a time.

Frames are written in the illustrated format so that overhead bytes and payload bytes are easily identified. Bytes in the first three columns, columns 110, are reserved for overhead bytes, and bytes in the remaining columns, columns 120, are payload bytes. When the data is transmitted serially, the first three bytes are overhead, the next 87 bytes are payload, the next three bytes are overhead, the next 87 bytes are payload, and so on.

The first three rows of overhead columns 110 are section overhead (SOH) bytes 140. SOH 140 is used to manage the frame at the lowest level. A frame may go through several hops between a source and a destination. For instance, over a 100 Kilometer trip, a frame may be regenerated every 10 Kilometers or so to ensure sufficient signal strength to make the entire trip. Each hop is called a section. SOH 140 controls regeneration of the frame at each hop.

The next six rows of overhead columns 110 are line overhead (LOH) bytes 150. LOH 150 is used to manage control of the frame at a higher level, as between the SONET device that originally sent the frame and the SONET device that ultimately receives the frame. LOH manages transport of the entire frame payload.

The frame payload includes a Synchronous Payload Envelope (SPE). In the illustrated embodiment, the SPE occupies the entire payload of the frame, rows 1 through 9, columns 4 through 90. In other words, the SPE occupies 783 of the total 810 bytes. The illustrated SPE is "aligned" with the frame in that the SPE boundary 130 is at row 1, column 4. In alternate embodiments, an SPE may not be aligned due, for instance, to timing variations in the network. That is, the 783 bytes of an SPE may span two SONET frames so that the boundary between two SPEs is located at some arbitrary position in the payload section of the frame. The LOH 150 includes a pointer (not shown) to the location of the SPE boundary. In the illustrated embodiment, since the SPE is aligned with the frame, the pointer in the LOH points to the SPE boundary 130 in row 1, column 4.

The 9 bytes of the SPE in column 4 are reserved for path overhead (POH) bytes. POH manages the frame at yet a higher level where, for instance, separate bit streams from many end users are combined into the SPE at the source and broken out from the SPE at the destination. In alternate embodiments in which the SPE is not aligned with the frame, the 9 POH bytes will be in the same column as the SPE boundary. As with the SPE itself, the 9 POH bytes may span two frames. In which case, each frame will include 9 POH bytes, but the POH bytes may be divided between two SPEs.

FIG. 2 illustrates one embodiment of a composite SONET frame. The composite frame is comprised of multiple planes identical to the single-plane frame illustrated in FIG. 1. That is, each plane in the composite frame includes 9 rows and 90 columns, with 9 bytes of SOH, 18 bytes of LOH, and 9 bytes of POH. In the illustrated embodiment, there are 192 planes in the frame.

The frame is read from front to back, and then left to right. That is, the byte in row 1, column 1 is read from each plane, starting with plane 1 and ending with plane 192. Then, the bytes in row 1, column 2 are read from all 192 planes, followed by the bytes in row 1, column 3 from all 192 planes, and so on. As the composite frame is read serially, the data stream comprises 9 iterations (one iteration for each row) of 576 bytes of section and line overhead (from 192 planes times 3 overhead bytes per row) followed by 16704 bytes of payload (from 192 planes times 87 payload bytes per row). Somewhere among each 16704 bytes of payload there are also between 64 and 192 continuous bytes of path overhead, depending on the logical construction of the composite frame (the maximum is from 192 planes times 1 path overhead byte per row; concatenated frame structures do not use all 192 planes for path overhead).

The composite frame of FIG. 2, like the single-plane frame of FIG. 1, is a single unit in the SONET network. That is, no matter how many planes a frame has, one frame is transmitted every 125 micro seconds, or 8000 times per second. By increasing the size of a frame by adding more planes, the data rate increases. For instance, the data rate for the single-plane frame of FIG. 1 is 810 bytes per frame times 8 bits per byte times 8000 frames per second, which equals 51.84 Megabits per second. For the 192-plane frame of FIG. 2, the data rate is 810 bytes per plane times 192 planes per frame times 8 bits per byte times 8000 frames per second, which equals 9.95328 Gigabits per second.

Since a frame is a single unit, transmitting a frame can be managed, for the most part, by using one set of overhead bytes. That is, the section, line, and path overhead (SOH, LOH, and POH) bytes from the first plane of a multi-plane frame are used during transmission, but many of the equivalent bytes in other planes of the frame are essentially ignored. For a 192-plane frame such as the one illustrated in FIG. 2, unused overhead accounts for more than 280 Mega bits per second of unused bandwidth from bytes reserved for section and line over head and up to an additional 110 Mega bits per second of unused bandwidth from bytes reserved for path over head. The present invention takes advantage of these unused overhead bytes to provide additional overhead functions.

Figure 3:
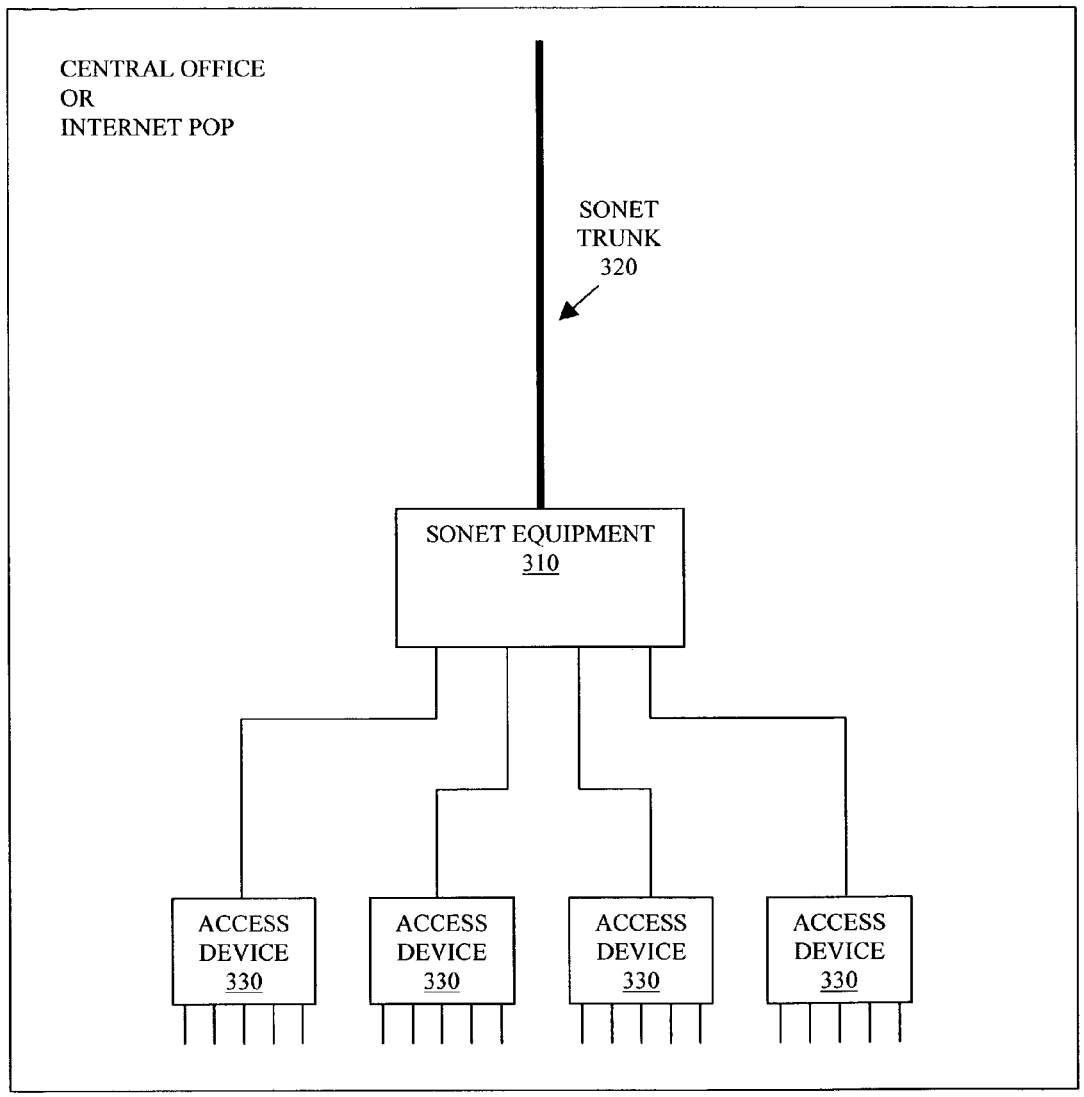
FIG. 3 illustrates a central office in which one embodiment of the present invention can be used.
Figure 4:
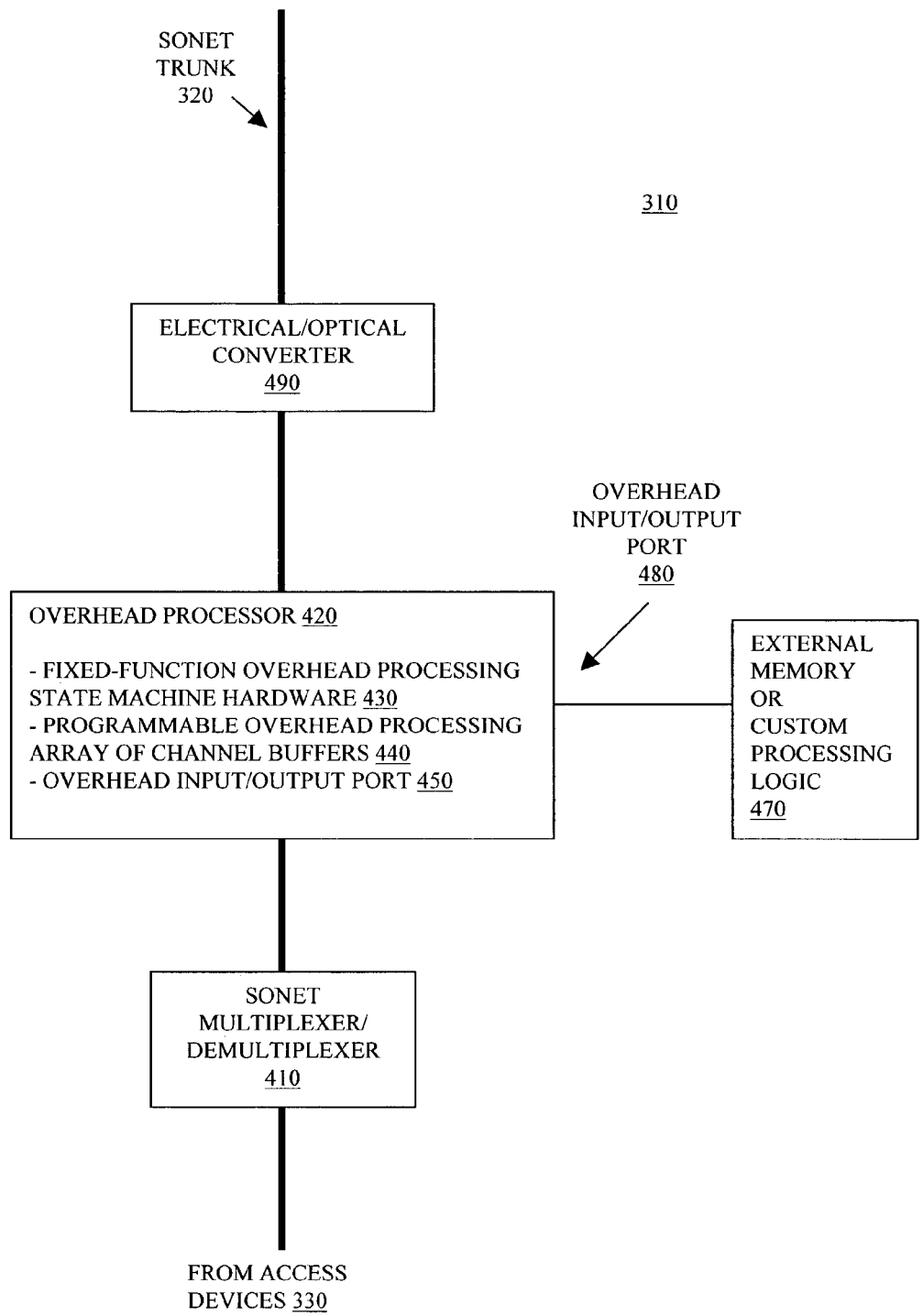
FIG. 4 illustrates one embodiment of the present invention.

FIGS. 3 and 4: Application of the Invention

FIG. 3 illustrates one embodiment of SONET equipment 310 in which the present invention can be used to process multiple levels of SONET overhead. In the illustrated embodiment, the SONET equipment 310 is coupled to a SONET trunk line 320 and a number of regional access devices 330. Access devices 330 may connect a wide variety of network services to the SONET equipment 310, such as analog phone lines, Digital Subscriber Lines (DSLs), digital cable lines, Integrated Service Digital Network (ISDN) lines, T1 lines, etc. The SONET equipment 310 comprises "path terminating equipment" or "line terminating equipment" for SONET frames. That is, the SONET trunk line 320 can carry a great deal more data than any one of the access devices 330. Data traffic from one or more of the access devices that is destined for a different region serviced by a different central office (not shown) is combined, or multiplexed, into the payloads of SONET frames and transmitted over the SONET trunk line 320 by SONET equipment 310. Conversely, data traffic sent from a different region over the SONET trunk line 320 that is destined for a user coupled to one of the regional access devices 330 is separated out, or demultiplexed, from the payloads of SONET frames by the SONET equipment 310.

Except for the teachings of the present invention, SONET equipment 310 is intended to represent a wide variety of path terminating equipment and line terminating equipment known in the art. Alternate embodiments of the present invention may similarly be used with any number of SONET devices, such as regenerators, routers, switches, and the like.

FIG. 4 illustrates one embodiment of the SONET equipment 310 from FIG. 3 in more detail. In the illustrated embodiment, the SONET equipment 310 includes a number of elements for processing regular SONET frames. For instance, the SONET equipment 310 includes a multiplexer/demultiplexer 410 which combines the multiple data streams from the access devices 330 into an aggregate data stream and vice versa. Multiplexer/demultiplexer 410 represents any number of devices that can perform the necessary function.

The SONET equipment 310 also includes electrical/optical converter 490. Electrical/optical converter 490 converts the aggregate stream of electrical data bits into equivalent optical pulses and vice versa. Electrical/optical converter 490 similarly represents any number of devices that can perform this function.

In alternate embodiments in which the present invention is used in a router, regenerator, or some other device that supports SONET, the device may also include a switch matrix as well as a variety of other suitable components. The components can be configured in any number of different ways without departing from the scope of the present invention.

In the illustrated embodiment, overhead processor 420 sits between the multiplexer/demultiplexer 410 and electrical/optical converter 490. For the outgoing data stream, the overhead processor 420 identifies where in the data stream overhead bytes should be inserted and inserts the appropriate overhead data. For the incoming data stream, the overhead processor 420 identifies where in the data stream the overhead bytes are located and processes the overhead data appropriately.

In one embodiment, the SONET equipment 310 uses a clock signal (not shown) received from the SONET network to identify the locations of overhead bytes. The SONET clock synchronizes the network so that each network element can identify the beginning of a new frame. The overhead processor 420 can then use the SONET clock to derive a byte clock to identify each new byte location, and consequently each overhead byte, in the data stream relative to the beginning of a frame. Except for the teachings of the present invention, overhead processor 420 is intended to represent any of a number of devices that can perform such functions.

Unlike known overhead processors, the inventive overhead processor 420 includes multiple stages of overhead processing, at least one of which can be programmed to utilize available overhead bytes for non-standard overhead functions and/or for changes to standard overhead functions. In general, the locations of available overhead bytes in each frame are known, so a data stream of non-standard bytes can be inserted into the SONET data stream at the known locations. In practice however, the speed at which SONET operates can create some challenges.

A frame having 192 planes includes about 155 thousand bytes. Each frame is transmitted once every 125 micro seconds, so a byte streams by in about 0.8 nanoseconds. To insert a byte from one data stream into another data stream during a window of opportunity that is less than a nanosecond long, the insertion apparatus must multiplex, or switch, between the two data streams and do so at precisely the right instant in time. The same is true for capturing a byte of data out of a data stream during such a short window of opportunity.

Fixed-function hardware tends to be better suited than software solutions for applications that require a great deal of speed and accurate response times. That is, software is executed by some form of programmable device, such as a data processor. One advantage of processors is that they are very flexible. They can execute instructions to handle countless different tasks simultaneously, and they can implement new and different tasks by simply loading different instructions.

A processor, however, is usually not the best choice for time critical operations because processors tend to stall from time to time when executing software. That is, when a processor is executing a number of different tasks, it prioritizes each task. Depending on what a processor is currently executing, other tasks may be forced to wait for a period of time before being serviced by the processor. When a window of opportunity is just nanoseconds long, even a very short delay by a processor can miss the opportunity.

Moreover, the more often a processor has to switch among tasks, the less efficient a processor tends to be. That is, each time a processor switches tasks, it will flush various registers of data having to do with the previous task and reload registers with new data having to do with the new task. Switching tasks too frequently can result in a situation called "thrashing," in which a processor spends more time flushing data and loading new data than it does actually executing instructions. A general-purpose processor that is sufficiently reliable and fast enough to multiplex data channels into available overhead bytes as the bytes stream by in mere nanoseconds would be prohibitively expensive.

On the other hand, a purely hardware solution is much faster and more reliable, but also much less flexible. In order to "reprogram" hardware to process a new overhead function, new hardware may need to be created to physically replace the old hardware. In which case, a purely hardware solution may also become prohibitively expensive after a certain number of new functions are implemented.

By using multiple stages of overhead processing, the present invention economically provides both speed and flexibility. For instance, in the illustrated embodiment, the overhead processor 420 includes three stages for processing available overhead bytes. The stages apply overhead to a transmit data stream in sequence; that is, each stage may overwrite some of the results of previous stages. By ordering the stages such that the most general operations are applied first, and by providing the ability to individually enable and disable the features of each stage with fine granularity, this sequenced design maintains flexibility and efficiency of implementation. The stages simply operate in parallel for a receive data stream.

FIG. 4: The First Overhead Processing Stage (450)

The first stage of overhead processing 450, in the illustrated embodiment, provides an overhead input/output port 480. This stage provides internal buffering, multiplexing, and timing functions to extract and insert overhead from and into the SONET data stream and pass only the overhead information across an input/output port at a greatly reduced data rate. For the 192 plane SONET data previously described, an eight bit embodiment of this port can operate at about 50 Megahertz. Such a port can be easily interfaced to external memory or custom processing logic 470. For transmit data, this overhead port may be used to provide a base state for all SONET overhead in each frame. For receive data, this port provides access to all overhead at a data rate that is compatible with software or programmable hardware processing. The first overhead processing stage 450 provides comprehensive overhead access functionality, and requires only a small amount of memory and logic to implement. It allows absolute flexibility in overhead interpretation, but requires the implementation of additional external processing to support standard functions. Many applications do not need access to the entirety of the SONET overhead; for example, adding an end-to-end voice channel for network maintenance requires access to only one byte per frame. The remaining stages of overhead processing complement the first stage by providing built-in support that addresses most needs.

FIG. 4: The Second Overhead Processing Stage (440)

In the illustrated embodiment, the second stage 440 uses a combined hardware interface with a software backend that is both programmable and comparatively inexpensive. The software backend manages a hardware array of channel buffers. The high speed, real-time switching among data streams is accomplished using a hardware multiplexer (not shown) that switches among the standard SONET data stream and one or more additional data streams, or channels, received from the array of channel buffers. As mentioned above, the additional data may simply overwrite available overhead bytes.

The locations at which data is inserted or extracted can be with respect to the start of a frame, as for data inserted in the section overhead (SOH) or line overhead (LOH) columns of a frame, or with respect to the boundary location of a synchronous payload envelope (SPE), as for data inserted in the path overhead (POH) of a frame. In the case of POH insertion, an SPE boundary location can be identified by a pointer located in the LOH overhead.

In one embodiment, the second stage 440 includes software instructions (not shown) to be executed by a processor (not shown). Execution of the software instructions configures the hardware of the second stage 440 for insertion of the additional data channels. Adapting to changes can be as easy as updating the software. In one embodiment, the software defines the number of active data channels and the row, column, and plane locations of each channel in each frame. Each data channel has a reserved first-in-first-out channel buffer in hardware, which may be implemented in a unified memory 460 or using individual FIFO memories, such as memories 610 described with respect to FIG. 6 below.

In the outgoing data stream, data for a particular channel is stored in the allocated memory region. The software cycles through memory regions assigned to the respective data channels and loads buffers corresponding to particular data channels in bursts. Simultaneously, the hardware interface identifies byte locations in a given frame corresponding to particular channels, reads bytes from the buffers corresponding to the channels, and inserts the bytes in the identified byte locations. In the incoming data stream, the same process is performed in reverse.

Writing a burst of data for a particular channel to or from a buffer all at once greatly reduces the frequency at which the processor has to switch channels. This slower switching speed allows for a comparatively slower, and therefore comparatively inexpensive, processor. The buffers also provide a margin of error for the processor. That is, the buffers are designed to hold enough bytes of data to last until the next time the processor is expected to service a particular buffer. The duration for which the data is expected to last in a buffer may be long enough to accommodate typical processor delays.

For many overhead functions, the data value in a particular channel remains static or cycles through a small number of values most of the time. Various embodiments of buffers provide enhancements to allow these operations to be handled without ongoing software intervention, such as optimizations in the underflow behavior of transmit buffers and value change detection in receive buffers. For instance, on underflow, a transmit buffer may repeat a last value, may wrap around to the oldest value, or stop transmitting entirely. An overflow condition on a receive buffer may cause a buffer to drop new data, drop the oldest data, or simply overwrite the oldest values without changing the buffer location that is to be read.

Although the second stage 440 is described in terms of a combined hardware/software solution, alternate embodiments may use entirely hardware or entirely software approaches. For instance, it may be possible to implement the functionality of the second stage in software as technology improves to provide faster, more reliable, less expensive processors, or in hardware as technology improves to provide larger, more versatile, more compact application specific integrated circuits (ASICs), programmable gate arrays (PGAs), etc.

The second stage is relatively complex in terms of memory and logic requirements per byte accessed, but provides a scalable means of accessing arbitrary overhead directly from a standard software control system. The second stage 440 complements the functionality of the first stage 450 by providing simple software access to a limited number of arbitrary overhead locations.

FIG. 4: The Third Overhead Processing Stage (430)

For functions that are clearly defined in the standards and/or are difficult to address in software, it makes sense to provide hard-wired hardware support. The final stage 430 in the illustrated embodiment comprises a state machine to process fixed function overhead. For instance, certain standard SONET overhead functions are unlikely to change during the service life of the SONET Equipment 310. In which case, a purely hardware solution can economically be used in the third stage 430 to process standard SONET overhead.

Also, many of the standard SONET overhead functions lend themselves particularly well to hardware processing. For instance, one standard function is a parity calculation. When a frame is transmitted, every bit in the frame is XORed and the result is written to a particular overhead byte location in a following frame. When the frame is received, every bit in the frame is again XORed and the result is compared to the result in the overhead byte location of the following frame. If the results do not match, an error is declared.

This type of overhead function is particularly well suited for fixed-function hardware because the calculations are performed on the SONET data stream itself. Not only does the function have to insert or extract data from a particular byte location, it needs to read every byte in the data stream, perform calculations on the data, and have a result ready in time to write to or compare to a byte location in a following frame.

In one embodiment, various third-stage functions are "switched." That is, one or more of the functions can be turned off. For instance, if a new error reporting function is to be implemented, the third-stage hardware that implements the old error reporting function can be turned off and the new error reporting function can be implemented using one of the other stages.

Figure 5:
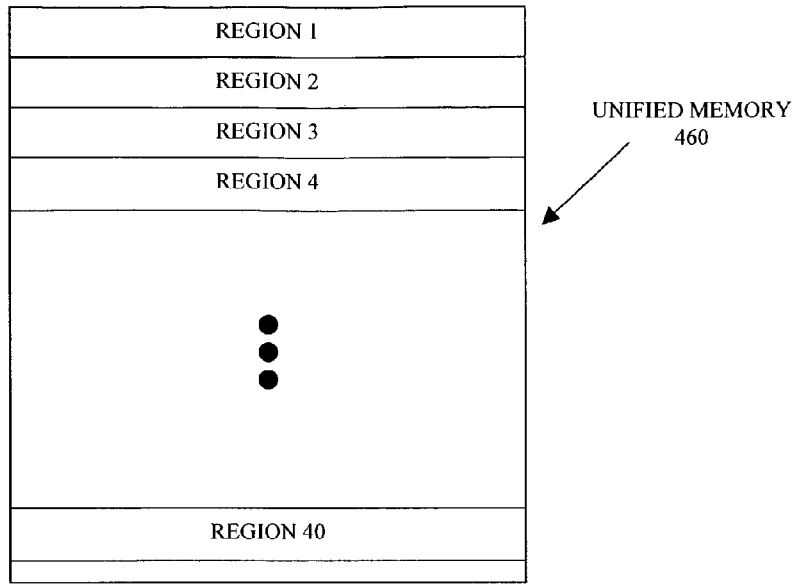
FIG. 5 illustrates one embodiment of a memory unit.
Figure 6:
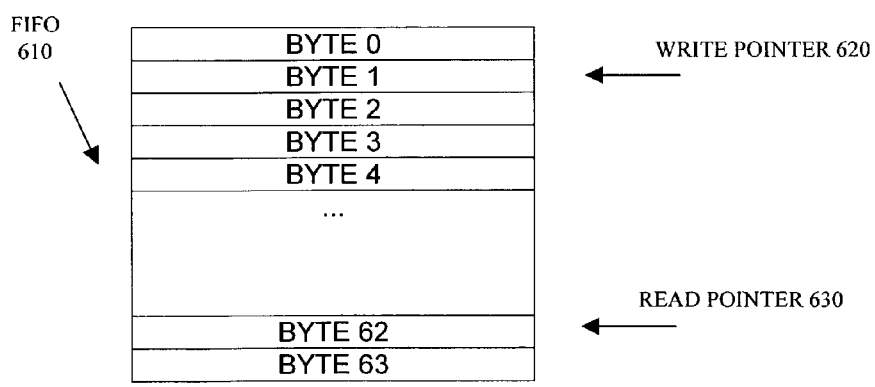
FIG. 6 illustrates one embodiment of a FIFO.

FIGS. 5 and 6: Memory Structures

FIG. 5 illustrates one embodiment of a unified memory unit 460. The memory is divided into regions corresponding to different channel buffers of the second insertion stage 440. The data in the memory can be accessed from outside the overhead processor 420, for instance, by a host processor or direct memory access (DMA) controllers. It is also accessed by the second insertion stage 440 as previously described. In the illustrated embodiment, the memory 460 contains regions defining 40 separate channels to be inserted into available overhead byte locations. In alternate embodiments, the memory 460 can be configured to define more data channels or fewer data channels.

FIG. 6 illustrates one embodiment of a FIFO 610 that may alternately be used in the array of channel buffers in the second stage of overhead processing 440 of FIG. 4. FIFO 610 includes 64 single byte storage locations. Each byte corresponds to a different frame. That is, each byte will be written to a different frame. Since frames are sent once every 125 microseconds and the FIFO stores 64 bytes, the FIFO can buffer enough data to last for 8 milliseconds if a byte is read from the FIFO and inserted in every frame.

In which case, in the outgoing data stream, to avoid an underflow condition, the software need only cycle through the FIFOs and return to FIFO 610 in less than 8 milliseconds to re-load the FIFO before it runs out of data. The software writes to the byte location indicated by the write pointer 620 and the hardware reads from the byte location indicated by the read pointer 630. An underflow condition occurs when the read pointer 630 equals the write pointer 620. As discussed above, various embodiments of buffers may treat underflow conditions differently. The reverse process can be applied for the incoming data stream.

Figure 9:
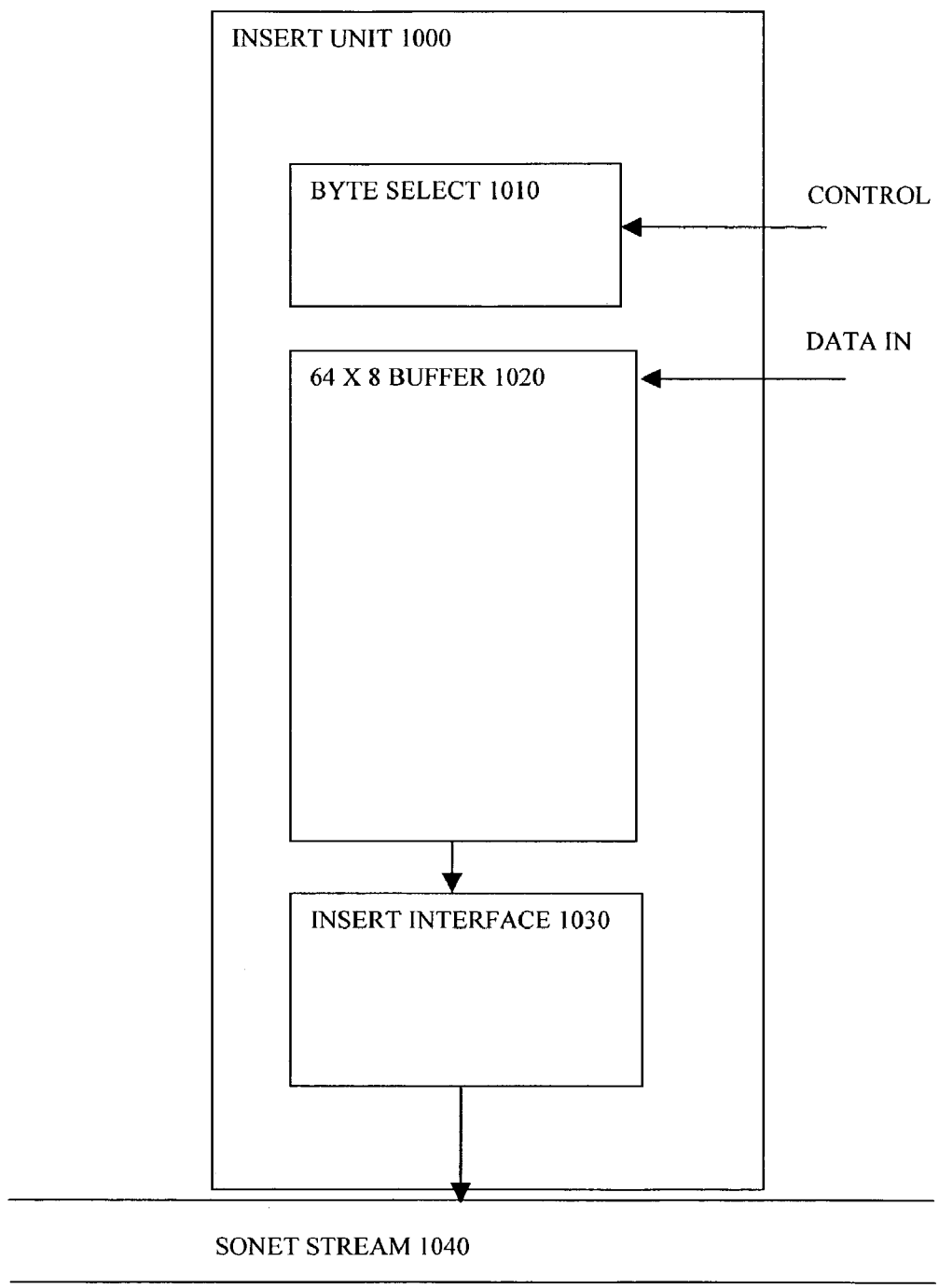
FIG. 9 illustrates one embodiment of an insertion unit.

FIG. 9: An Insertion Unit

Skipping to FIG. 9, FIG. 9 illustrates one embodiment of an insertion unit 1000 suitable for use in the second stage 440 of FIG. 4. The insertion unit 1000 includes programmable byte select 1010. Byte select can be programmed by the software with a row, column, and plane location of an overhead byte to be overwritten.

The insertion unit 1000 also includes a buffer 1020. In the illustrated embodiment, the buffer stores up to 64 bytes of data. Software loads buffer 1020 with bursts of data. As previously described, this buffer may be implemented as a FIFO, such as FIFO 610 of FIG. 6, contained within the insertion unit or as a region in a unified memory, such as unified memory 460 of FIG. 4, shared among insertion units.

Insertion interface 1030 takes one byte at a time from buffer 1020 and inserts it into the programmed overhead location in the SONET stream 1040 at a constant rate. That is, one frame of SONET data streams by every 125 microseconds, so interface 1030 inserts one byte of data every 125 microseconds.

The second stage 440 may include a number of programmable insertion units such as insertion unit 1000. One embodiment includes 40 insertion units. In alternate embodiments any number of insertion units could be used. For instance, one embodiment could include 36 insertion units per plane in each SONET frame, one insertion unit corresponding to each section, line, and path overhead byte. For a 192 plane frame, that would be 6912 insertion units. Of course, larger numbers of insertion units would increase the cost of the overhead processor.

Figure 10:
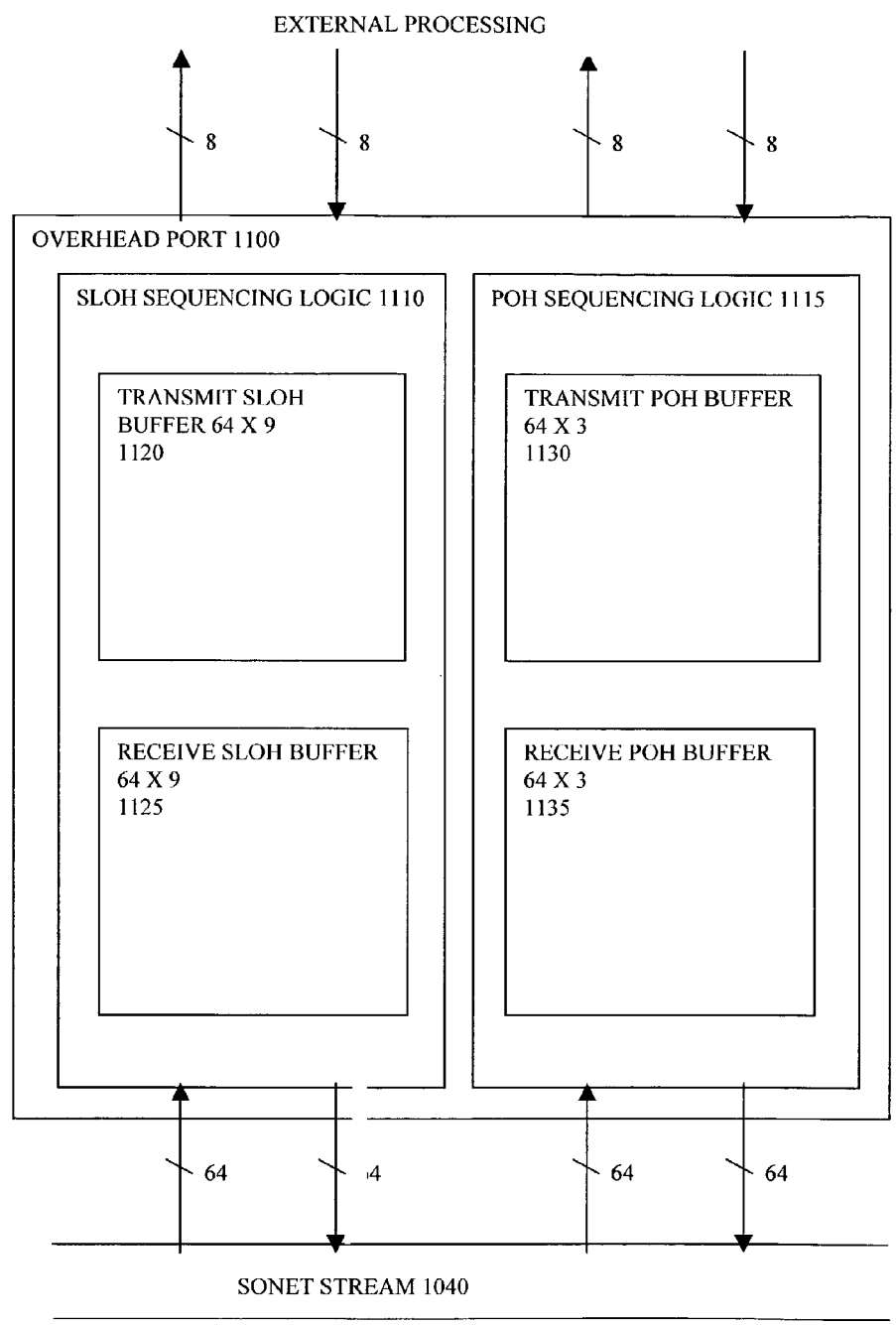
FIG. 10 illustrates one embodiment of an overhead input/output port.

FIG. 10: An Overhead I/O Port

FIG. 10 illustrates one embodiment of an overhead input/output port 1100 suitable for the first level of processing 450 in FIG. 4. In general, the overhead port can arbitrarily capture SONET overhead bytes and provide them for external processing. Conversely, the overhead port can receive data from external processing and arbitrarily insert, or overwrite, SONET overhead bytes. In other words, the overhead port can provide complete access to all of the overhead bytes.

In the illustrated embodiment, the overhead port 1100 captures all of the overhead bytes. Basically, the overhead port 1100 comprises a rate buffering device. The data rate for a 192 plane frame is about 10 gigabits per second. External software processing is likely to be much slower and, as discussed previously, an external processor is likely to stall from time to time.

Fortunately, the overhead bytes come in bursts. That is, a SONET frame has 576 serial bytes of section or line overhead followed by 16704 serial bytes of payload. At some predetermined location among the payload bytes, there are up to 192 serial bytes of path overhead. The overhead port 1100 receives the overhead bytes in bursts and provides the overhead at some slower constant data rate that can be handled by external processing.

In the illustrated embodiment, the overhead port 1100 divides the data stream into two bidirectional paths, one for the section and line overhead, sequencing logic 1110, and one for the path overhead, sequencing logic 1115. Dividing the data stream allows timing for the two paths to be decoupled, which is important because of the floating nature of the SONET SPE.

The section and line overhead sequencing logic 1110 needs to pass 41,472 bits of data every 125 microseconds, which is equivalent to a data rate of about 330 megabits per second. For receive traffic, sequencing logic 1110 receives the overhead bytes from the SONET stream at 10 Gb/s and stores them to a 576 byte buffer 1125. From there, the data is delivered to the overhead port 1100 as byte-wide data. This data may be presented at a constant rate of 41.472 MHz, or may be presented in bursts at a higher rate. Sequencing logic 1110 ensures that the buffer 1125 is completely filled for every row of the SONET frame to reduce the required buffer size. Transmit traffic follows the reverse path with a separate buffer 1120.

Similarly, the path overhead sequencing logic 1115 needs to pass up to 13,824 bits of data every 125 microsecond, which is equivalent to a data rate of up to 110 megabits per second. For receive traffic, sequencing logic 1115 receives the overhead bytes from the SONET stream at 10 Gb/s and stores them to a 192 byte buffer 1135. From there, the data is delivered to the overhead port 1100 as byte-wide data. This data may be presented at a constant rate of 13.824 MHz, or may be presented in bursts at a higher rate. Sequencing logic 1115 ensures that the buffer is completely filled for every row of the SONET frame to reduce the required buffer size. Transmit traffic follows the reverse path with a separate buffer 1130.

Alternate embodiments may use different sizes and configurations of buffers and data words to reduce the SONET data rate depending on the speed and bus size of the external processing.

Figure 7:
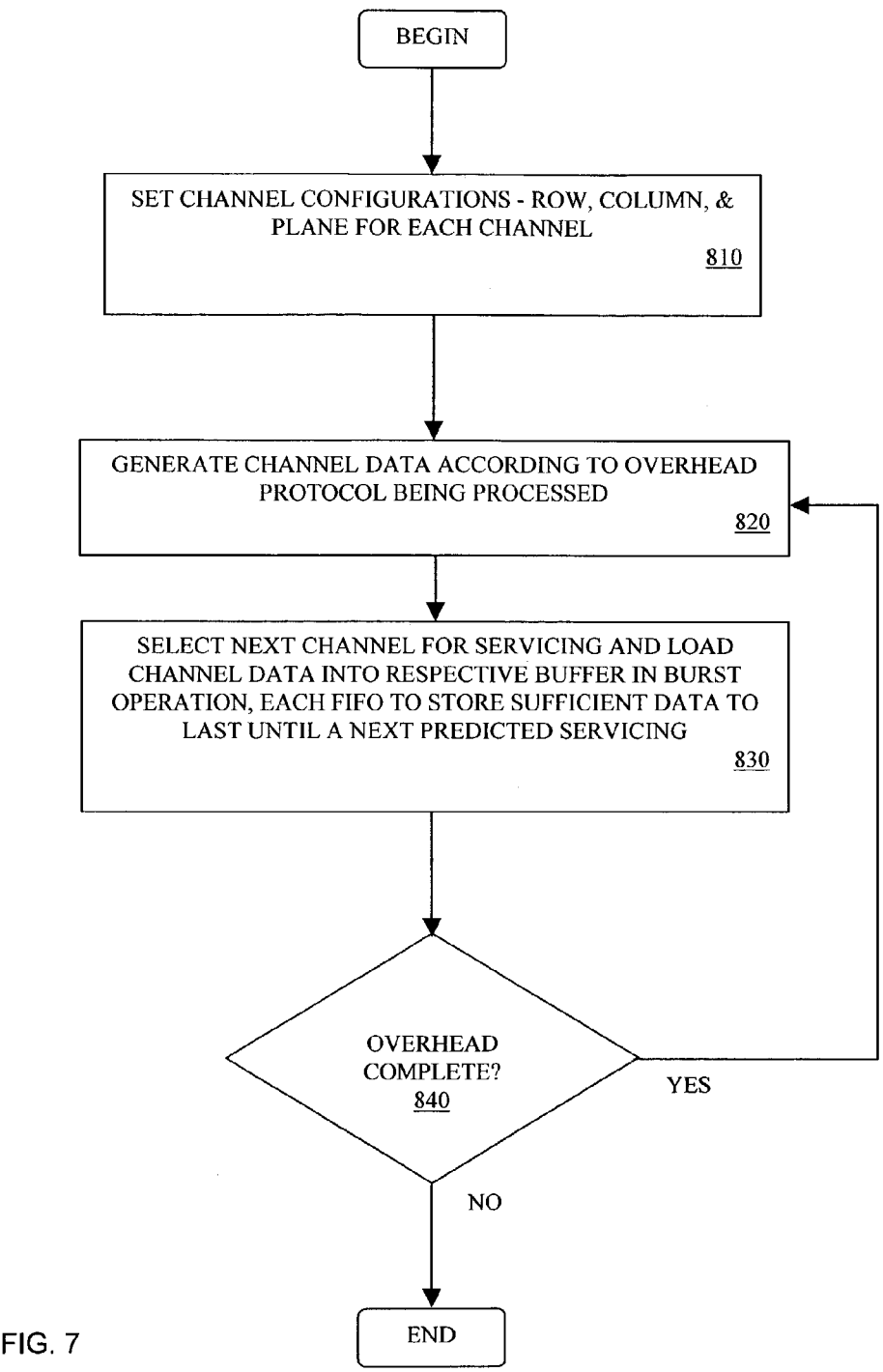
FIG. 7 demonstrates one embodiment of the present invention for loading channel buffers.
Figure 8:
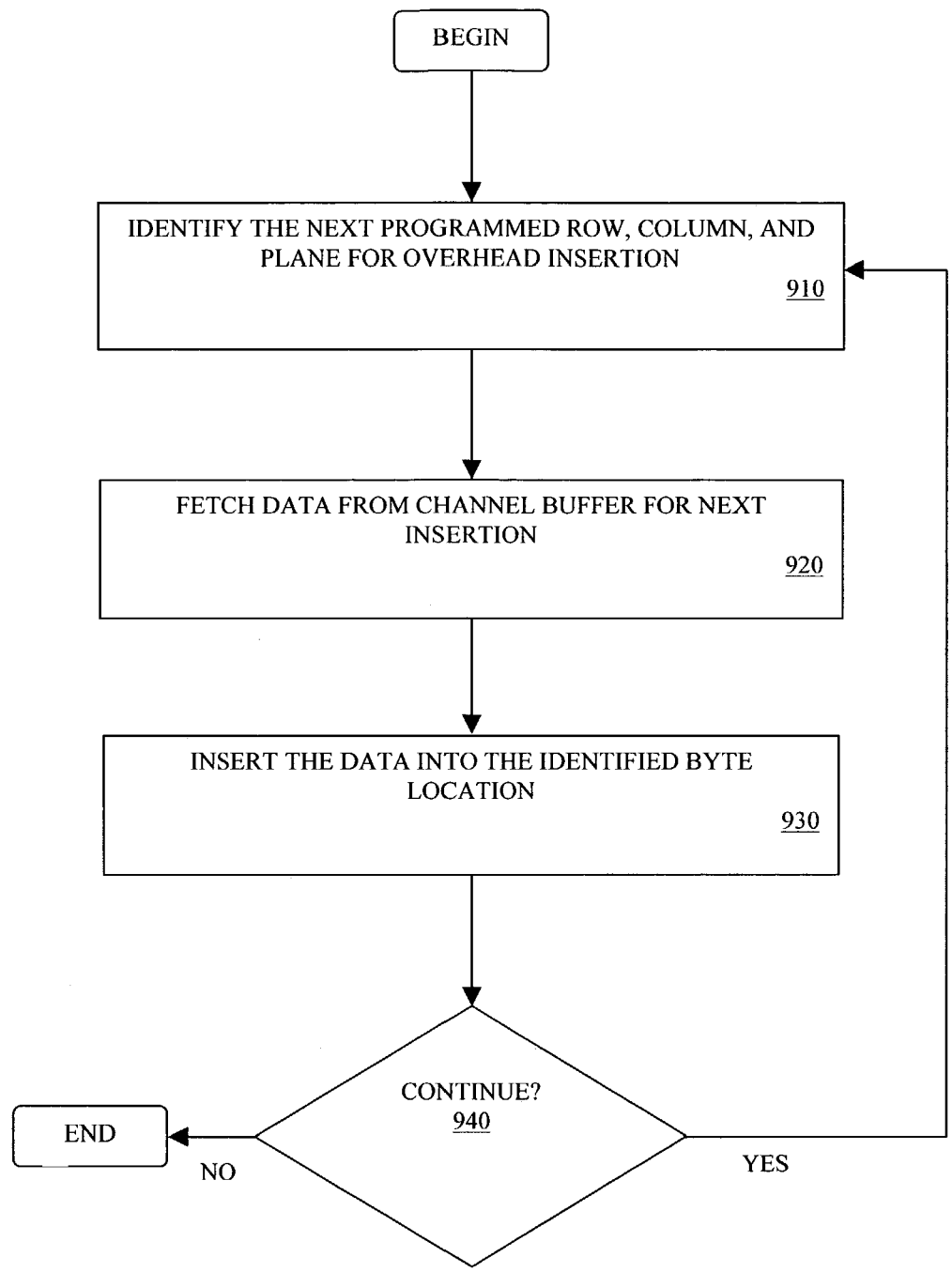
FIG. 8 demonstrates one embodiment of the present invention for inserting bytes from interface buffers into unused byte locations.

FIGS. 7 and 8: Insertion Unit Data/Control Example

Skipping back to FIGS. 7 and 8, FIGS. 7 and 8 demonstrate one embodiment of the simultaneous hardware and software processes performed by one embodiment of the second stage of overhead processing 440 of FIG. 4 for inserting data. Similar complementary processes can be used to extract data. In general, the present invention receives bytes comprising a data channel, locates particular unused byte locations within an overhead portion of a SONET frame, and inserts the bytes into the particular locations. The illustrated embodiment includes a number of implementation specific details. Alternate embodiments may not include all of the illustrated elements, may include additional elements, and may perform one or more elements in different orders.

In FIG. 7, one embodiment of the software portion of an insertion apparatus is demonstrated. The insertion apparatus is initialized at block 810. Initialization may include programming byte locations for a particular number of data channels. In the illustrated embodiment, each data channel is assigned a particular row, column, and plane location that is the same for each frame. In alternate embodiments, a channel may be assigned multiple byte locations in each frame, or the byte locations may change over time.

In block 820, the software generates channel data according to the standards-based or proprietary overhead communication protocol being processed. This data may be stored in a memory unit local to the processing element on which the software is executing (not shown).

In block 830, the software selects a channel for servicing. The selected channel is serviced by loading the data generated in the previous step into a corresponding channel buffer in a burst operation. The selection can be made based on a service cycle schedule.

In block 840, if the software is to continue inserting overhead, the process returns to generate more data, select a channel for servicing, and load the respective channel buffer. If no more data is to be inserted, the process stops.

FIG. 8 demonstrates one embodiment of the hardware portion of an insertion apparatus, in which multiple insertion units are implemented with unified control logic. In block 910, the hardware identifies the next pending insertion row, column and plane. Identifying the byte location may involve counting byte locations or counting rows, columns, and planes from the beginning of a frame for data to be inserted in the section or line overhead (SOH or LOH). For data to be inserted in the path overhead (POH), the hardware may insert the data with respect to the position of the SPE boundary.

In block 920, the hardware fetches the data for the next insertion. In block 930, the hardware inserts the byte of data in the identified byte location. In block 940, the hardware checks to see if it is enabled to continue insertion. If so, the process returns to block 910. Otherwise, the process ends.

CONCLUSION

In one embodiment, the present invention, as described above, is implemented as part of an application specific integrated circuit (ASIC) for protocol processing. The software described could be implemented in code running on an embedded controller as will be comprehended by a person skilled in the art. In another example, field programmable gate arrays (FPGAs) or static programmable gate arrays (SPGA) could be used to implement one or more functions of the present invention. In yet another example, a combination of hardware and software could be used to implement one or more functions of the present invention in various embodiment, instructions implementing the invention may be embodied in a machine readable medium.

Thus, multi-stage SONET overhead processing is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
   an overhead processor including a plurality of processing stages, at least one of the pluralities of processing stages being adaptive to provide separate access mechanisms for processing a plurality of overhead bytes in a plurality of Synchronous Optical Network (SONET) frames, wherein at least one of the separate access mechanism is adapted for both insertion and extraction of the plurality of overhead bytes; and
   wherein the plurality of processing stages comprises:
   a first stage to provide access to an entire set of the plurality of overhead bytes in the plurality of SONET frames for external processing; and
   a second stage to programmably process a programmable set of overhead bytes in the plurality of SONET frames.

2. The apparatus of claim 1, further comprising a third stage to process a fixed set of overhead bytes in each of the plurality of SONET frames, wherein the fixed set of overhead bytes comprise predefined data fields used for standard SONET functions.

3. The apparatus of claim 1 wherein the programmable set of overhead bytes define one or more data channels to provide one or more standard or proprietary SONET functions.

4. The apparatus of claim 1 wherein the overhead processor is adapted to program the second stage with locations within the plurality of SONET frames for the programmable set of overhead bytes.

5. The apparatus of claim 4 wherein the locations comprise frames selected from among the plurality of SONET frames.

6. The apparatus of claim 1, further comprising a third stage to process a fixed set of overhead bytes in each of the plurality of SONET frames, wherein the third stage comprises a standard SONET hardware state machine.

7. The apparatus of claim 1 wherein the second stage comprises an array of hardware channel buffers to queue bytes of data for insertion in and/or reception from programmed locations within the plurality of SONET frames.

8. The apparatus of claim 7 wherein the array of hardware channel buffers are written to and/or read from in bursts in response to execution of software instructions, and wherein the array of channel buffers write to and/or read from the programmed locations within the plurality of SONET frames serially.

9. The apparatus of claim 1 further comprising: a memory to store data to be inserted to and/or received from the overhead bytes in the plurality of SONET frames.

10. The apparatus of claim 1 wherein the first stage comprises a rate buffering unit to capture and/or insert the entire set of overhead bytes at a SONET frequency and to provide and/or receive the entire set of overhead bytes at an external processing rate.

11. The apparatus of claim 1 wherein the second stage comprises a plurality of capture and/or insertion units.

12. The apparatus of claim 11 wherein each capture and/or insertion unit comprises a configurable byte select, a memory unit, and a SONET interface.

13. The apparatus of claim 12 wherein the memory unit comprises a 64 byte first-in-first-out (FIFO) buffer.

14. The apparatus of claim 11 wherein memories within the plurality of capture and/or insertion units collectively comprise a distributed memory.

15. A method comprising:
 processing a plurality of overhead bytes in a plurality of Synchronous Optical Network (SONET) frames in multiple stages, two or more of the multiple stages being adapted to use associated separate access mechanisms to the plurality of overhead bytes, wherein at least one of the separate access mechanism is adapted for both insertion and extraction of the plurality of overhead bytes; and
 wherein the processing in the multiple stages comprises:
  programmably processing a programmable set of overhead bytes in the plurality of SONET frames; and
  processing a fixed set of overhead bytes in each of the plurality of SONET frames.

16. The method of claim 15 wherein processing the fixed set of overhead bytes comprises: performing fixed-function processing using fixed function hardware.

17. The method of claim 15 wherein programmably processing the programmable set of overhead bytes comprises:
 configuring a hardware interface to overwrite particular SONET bytes comprising the programmable set of overhead bytes; and
 loading the hardware interface with one or more data channels, said hardware interface to overwrite the particular SONET bytes with the one or more data channels.

18. The method of claim 15 wherein programmably processing the programmable set of overhead bytes comprises:
 configuring a hardware interface to capture particular SONET bytes comprising the programmable set of overhead bytes; and
 receiving one or more data channels from the hardware interface as said hardware interface captures the one or more data channels from the particular SONET bytes.

19. The method of clam 15, wherein the processing in the multiple stages further comprises providing access for external processing of an entire set of the plurality of overhead bytes in the plurality of SONET frames including:
 capturing the entire set of overhead bytes at a SONET frequency buffering the entire set of overhead bytes; and
 providing the entire set of overhead bytes at an external processing frequency.

20. The method of clam 15 further comprising providing access for external processing of an entire set of overhead bytes in the plurality of SONET frames including:
 receiving externally processed data at an external processing frequency; buffering the externally processed data; and
 overwriting the entire set of overhead bytes with the externally processed data at a SONET frequency.

21. An article comprising:
 a machine readable medium encoded with a data structure having stored thereon machine executable instructions that when executed implement a method comprising:
  processing a plurality of overhead bytes in a plurality of Synchronous Optical Network (SONET) frames in multiple stages, two or more of the multiple stages being adapted to use associated separate access mechanisms to the plurality of overhead bytes, wherein at least one of the separate access mechanisms is adapted for both insertion and extraction of the plurality of overhead bytes; and
  wherein the processing in the multiple stages comprise:
   providing access for external processing of an entire set of the plurality of overhead bytes in the plurality of SONET frames; and
   programmably processing a programmable set of overhead bytes in the plurality of SONET frames.

22. The article of claim 21, wherein the processing in the multiple stages further comprises processing a fixed set of overhead bytes in each of the plurality of SONET frames including:
 performing fixed-function processing using fixed function hardware.

23. The article-of claim 21 wherein programmably processing the programmable set of overhead bytes comprises:
 configuring a hardware interface to overwrite particular SONET bytes comprising the programmable set of overhead bytes; and
 loading the hardware interface with one or more data channels, said hardware interface to overwrite the particular SONET bytes with the one or more data channels.

24. The article of claim 21 wherein programmably processing the programmable set of overhead bytes comprises:
 configuring a hardware interface to capture particular SONET bytes comprising the programmable set of overhead bytes; and
 receiving one or more data channels from the hardware interface as said hardware interface captures the one or more data channels from the particular SONET bytes.

25. The article of clam 21 wherein providing access for external processing of the entire set of overhead bytes comprises:
 capturing the entire set of overhead bytes at a SONET frequency;
 buffering the entire set of overhead bytes; and
 providing the entire set of overhead bytes at an external processing frequency.

26. The article of claim 21 wherein providing access for external processing of the entire set of overhead bytes comprises:
 receiving externally processed data at an external processing frequency;
 buffering the externally processed data; and
 overwriting the entire set of overhead bytes with the externally processed data at a SONET frequency.

27. The apparatus of claim 1 wherein the multi-stage overhead processor comprises an application specific integrated circuit (ASIC).

28. The apparatus of claim 2 wherein the third stage comprises an application specific integrated circuit (ASIC).

* * * * *